INVENTOR.
WALLACE E. BELCHER JR
BY
Arthur H. Swanson
ATTORNEY.

Jan. 8, 1963 W. E. BELCHER, JR 3,072,846

ANALOG TO DIGITAL CONVERTER

Filed Jan. 16, 1959 2 Sheets-Sheet 2

INVENTOR.
WALLACE E. BELCHER JR.

BY Arthur H. Swanson

ATTORNEY.

United States Patent Office 3,072,846

Patented Jan. 8, 1963

3,072,846

ANALOG TO DIGITAL CONVERTER

Wallace E. Belcher, Jr., Bala Cynwyd, Pa., assignor to Minneapolis-Honeywell Regulator Company, Minneapolis, Minn., a corporation of Delaware Filed Jan. 16, 1959, Ser. No. 787,143
1 Claim. (Cl. 324—99)

The present invention relates to electrical measuring apparatus. More specifically, the present invention relates to electrical measuring apparatus of the type which operate on the principle of comparison encoding.

An object of the present invention is to provide a new and improved comparison encoding electrical measuring apparatus.

Another object of the present invention is to provide a new and improved circuitry for performing the logical operations in a comparison encoding measuring apparatus.

Still another object of the present invention is to provide a new and improved comparison encoding measuring apparatus for obtaining a digital representation of the magnitude of a measured quantity.

A further object of the present invention is to provide a new and improved comparison encoding measuring apparatus, as set forth herein, having a simplified operation and construction.

In accomplishing these and other objects, there has been provided, in accordance with the present invention, a comparison encoding electrical measuring device having a sequentially operated reference signal generator. The sequential operation of the signal generator produces a sequence of groups of incremental reference signals having decimally related amplitudes. A difference signal resulting from a subtraction of the reference signals from the information input signal is sensed by a polarity comparator. The comparator retains desired ones of each group of incremental reference signals in an additive or subtractive relationship with respect to alternate groups of reference signals to produce a composite reference signal equal to the input signal. An output device responsive to the aforesaid retentions is used to indicate the decimal value of the input signal.

A better understanding of the present invention may be had from the following detailed description when read in connection with the accompanying drawings, in which.

Figure 1:
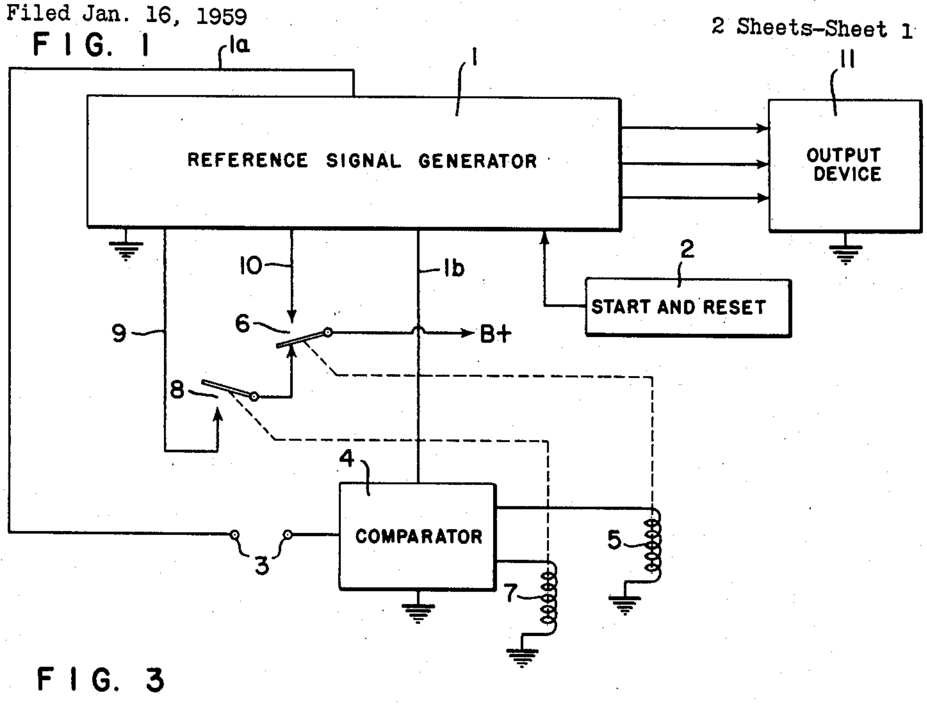
FIG. 1 is a schematic representation of a comparison encoding measuring device embodying the present invention.
Figure 2:
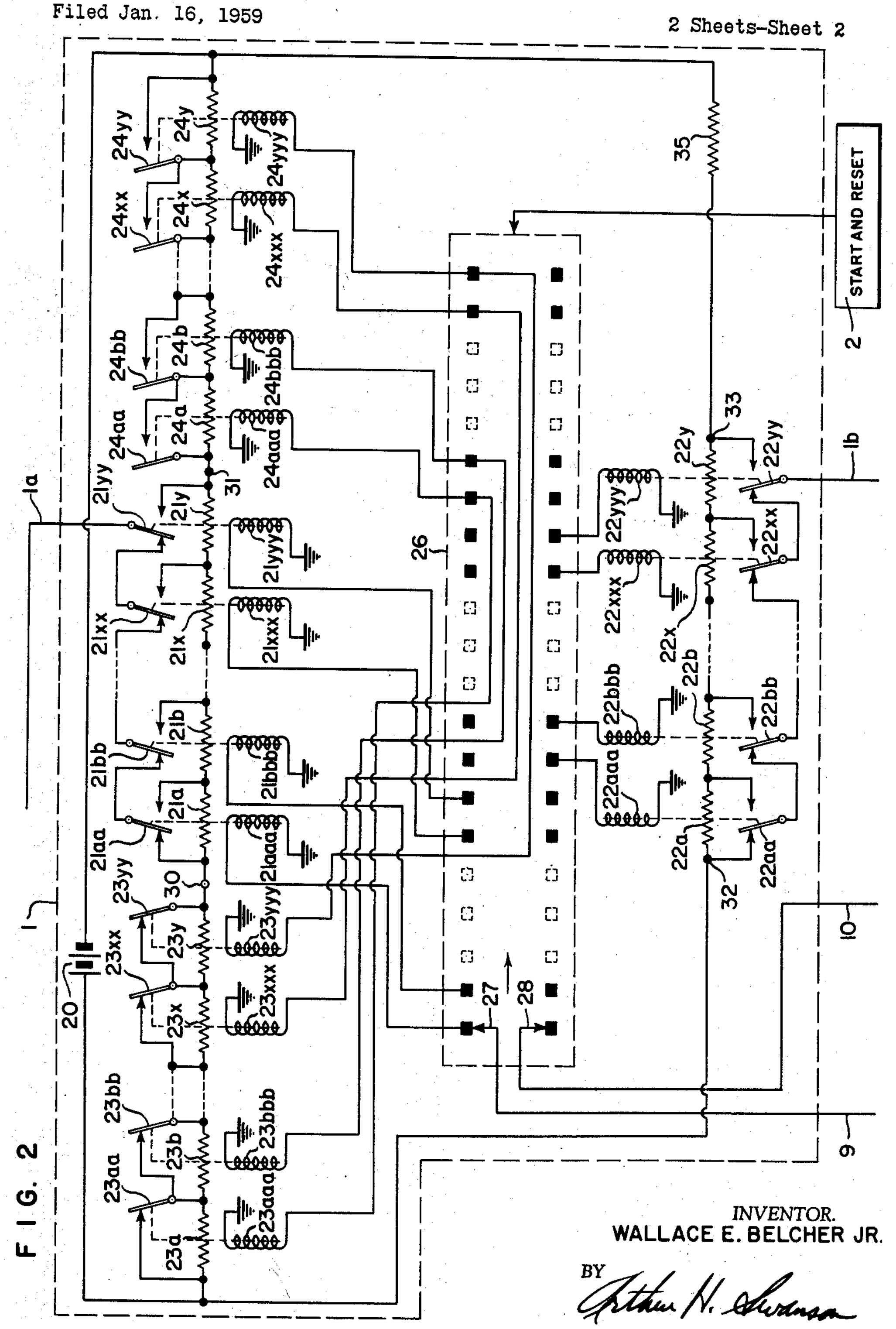
FIG. 2 is a schematic representation of a reference signal generator for use with the measuring device shown in FIG. 1.

Referring to FIG. 1 in more detail, there is shown a comparison encoding measuring device with a reference signal generator 1. The signal generator 1 may be any suitable one of many electronic or electro-mechanical devices used to automatically produce a sequence of varying amplitude signals; such devices being well-known in the art. A suitable electro-mechanical reference signal generator is shown in FIG. 2, discussed in detail hereinafter.

A start and reset device 2 is used to control the automatic cycle of the signal generator 1. The start-reset device 2 may be a pair of manually-operated switches controlling the terminal operations of the signal generator 1.

Figure 3:
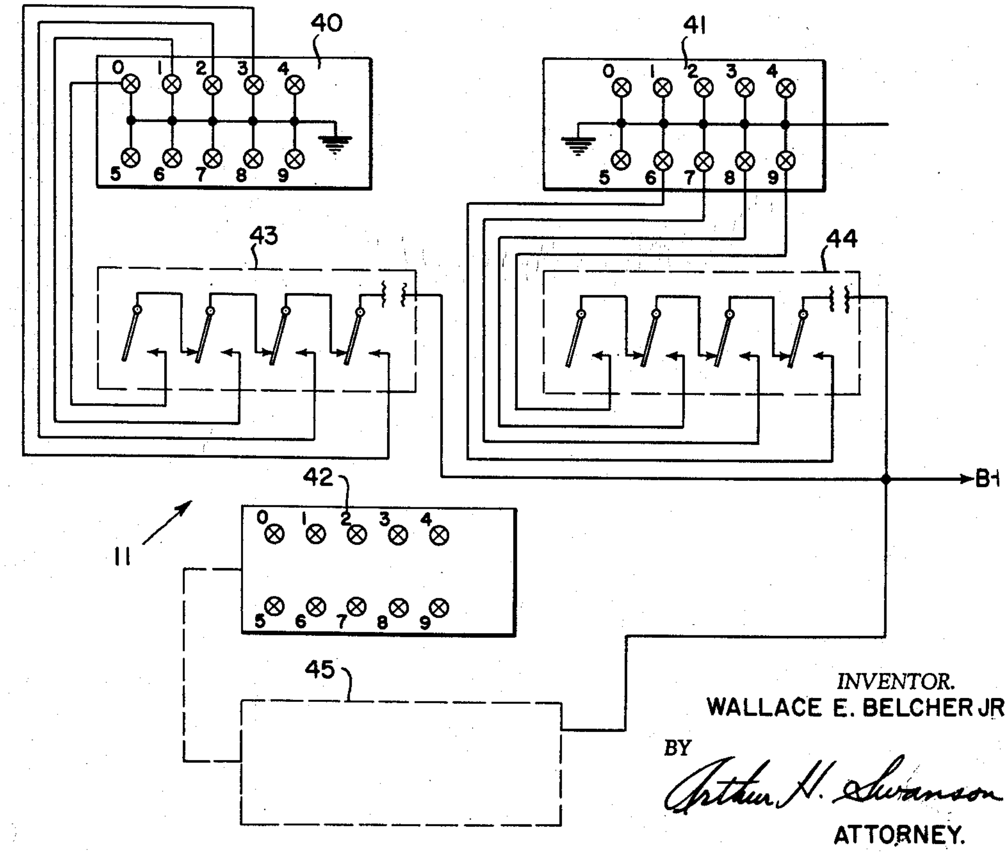
FIG. 3 is a schematic representation of an output device for use with the measuring device shown in FIG. 1.

A pair of input terminals 3 are provided for connection to a source of information input signals. The input signals may be representations of temperature, flow, pressure or any other variable. The reference signal from the reference signal generator 1 fed along a pair of reference signal lines 1*a* and 1*b* is arranged in an opposing relationship with the information input signal. The net signal resulting from this opposing relationship is applied as a control signal to a polarity comparator 4. The polarity comparator 4 may be any one of many electronic devices used to produce two mutually exclusive output signals; each of the output signals corresponding to a different polarity of the control signal; such devices being well-known in the art. The output signals from the polarity comparator 4 are separately used to control corresponding relay switches. Thus, one polarity of the control signal; e.g., positive, produces a corresponding output signal from the comparator 4 to energize a so-called positive relay coil 5. The positive relay coil 5 controls a single-pole, double throw switch 6, hereinafter referred to as a SPDT switch 6. The other or negative, polarity of the control signal energizes a so-called negative relay coil 7 to control a relay switch 8. The operation of the SPDT switch 6 and the relay switch 8 controls the energization of the reference signal generator 1 from a power source designated as B+ in FIG. 1 by selectively feeding an energizing signal to the reference signal generator 1 along one of a pair of energizing signal lines 9 and 10. An output device 11 is connected to the reference signal generator 1 to sense the operation thereof, and, thereby, to produce an indication of the digital value of the input signal. A suitable output device 11 is shown in FIG. 3 and described hereinafter.

The mode of operation of the apparatus of the present invention follows:

Assuming the SPDT switch 6 and the relay switch 8 are initially in the positions illustrated in FIG. 1, an encoding cycle initiates with the application of a unidirectional input signal to the input terminals 3, which input signal is arranged to produce the positive polarity of the control signal. The value of the reference signal initially is assumed to be zero, and the positive polarity control signal produced by the input signal is applied to the comparator 4. The positive control signal produces an energization of the positive relay coil 5 to operate the SPDT switch 6. The operation of this switch 6 connects B+ to a so-called positive energizing signal line 10. The automatic operation of the signal generator 1 is subsequently initiated by the start-reset device 2.

The signal generator 1 is arranged to supply the varying amplitude reference signals in a series of groups of incremental reference signals. The groups of signals are decimally related to each other and are each composed of a succession of signals having progressively increasing amplitudes. For example, the first group of signals may be representative of a hundred's decimal group, i.e., "100, 200, 300," etc. A second group would represent a ten's group; i.e., "10, 20," etc.; and a third group, units; i.e., "1, 2, 3," etc. It will be understood that the aforesaid representative magnitudes of the decimal groups may be altered to produce other decimal groups having the same relative signal amplitudes. For example, the use of lower magnitudes for the decimal groups; e.g., "1, 0.1 and 0.01," has utility in the measurement of low-level input signals; e.g., thermocouple signals, etc. Further, the groups of reference signals are arranged in an alternately additive and subtractive relationship with respect to each other. As previously mentioned, the composite reference signal is arranged to provide a control signal for the comparator 4 which is the difference of the composite reference signal and the input signal.

The signal generator 1 initially supplies a series of signals representing the "100's" group, starting with the lowest amplitude signal; i.e., "100." The net signal resulting from the combination of this reference signal and the input signal is applied to the comparator 4. If the resulting polarity of the control signal is negative, indicating a greater reference signal than input signal, the comparator 4 deenergizes the positive relay coil 5 and energizes the negative relay coil 7. If the polarity of the net signal remains positive, the comparator 4 retains the energized condition of the positive relay 5. The retention of the energization of the positive relay 5 allows the signal generator 1 to continue to supply reference signals having increasing amplitudes within the "100's" group. When the polarity of control signal does reverse, the aforesaid transfer of energization from the positive relay coil 5 to the negative relay coil 7 terminates the suppliy of reference signals within the "100's" group. Also, the last signal supplied from the "100's" group is retained as a reference signal by the signal generator 1.

The further operation of the signal generator 1 with the B+ applied along a so-called negative energizing signal line 9 produces reference signals representing the next decimal group, starting with the lowest group signal; i.e., "10." However, the reference signals from the "10's" group of signals are arranged to subtract from the retained reference signal of the first group. Thus, the composite reference signal representing the operation of the signal generator 1 in the "10's" group is the difference between the retained first group signal and the signals from the "10's" group.

The signal generator automatically produces increasing signals representing the "10's" group until the control signal polarity changes from negative to positive. This change in polarity indicates that the amplitude of the reference signal is lower than the amplitude of the input signal. The polarity change effects a transfer of the energizing signal from the comparator 4 from the negative coil 7 to the positive coil 5. The energization of the positive coil 5 terminates the reference signals from the "10's" group with a retention of the last signal supplied from the "10's" group.

The continued operation of the signal generator 1 with the positive coil 5 energized and B+ applied along the positive line 10 produces reference signals representing a third or units group. The reference signals of the units group, starting with an amplitude "1," are arranged to add to the composite reference signal composed of the retained signals from the first and second groups. As in the case of the prior groups of reference signals, the signal generator 1 automatically produces signals in the units group until the polarity of the control signal changes. The change in polarity of the control signal transfers the energization signal from the comparator 4 from the positive coil 5 to the negative coil 7. The deenergization of the positive relay coil 5 terminates the signals from the units group with a retention of the last signal supplied therefrom. The final composite reference signal is composed of the retained first group signal minus the retained second group signal plus the retained third group signal.

The retained signals from the signal generator 1 are sensed by the output device 11 and translated into a decimal representation of the value of the input signal. The start-reset device 2 is used to remove all the retained reference signals and to start the automatic operation of the signal generator 1 in a new encoding cycle.

The operation of the present invention may be illustrated by the following numerical example. In this example, it is assumed that the input signal has an amplitude of "786" volts. The operation of the first group of reference signals, consequently, is terminated at a reference signal of "800" volts. The "800" volts is retained by reference signal generator and the signals of the second group are subtracted therefrom. The subtraction operation of the second group of signals is terminated at a retained "20" volt step to produce a composite reference signal of "780" volts. The operation of the third group of signals is terminated at a retained "7" volt step. The output device 11 translates the retained reference signals into a decimal representation of "786" corresponding to the "786" volt input signal.

In FIG. 2, there is shown a suitable signal generator for use with the apparatus shown in FIG. 1. It will be understood that the other elements of the present invention shown in FIG. 1 are not shown in this simplified representation.

Basically, the reference signal generator 1, shown in FIG. 2, is a balanced split potentiometer circuit with a pair of reference signal lines 1*a* and 1*b* corresponding to a pair of connections. The potentiometer circuit is energized by a unidirectional power supply, represented by a battery 20. The potentiometer circuit comprises three groups of serially connected similar resistors. The resistors of each group have values corresponding to the decimal group represented thereby. Thus, resistors in a first group 21*a*, 21*b* . . . 21*x*, 21*y* may each have a value of "100" ohms to represent a "100's" group.

The number of resistors in a group is equal to the number of signal steps required for a signal group; e.g., a decimal signal group has ten resistors. A first potentiometer connection 1*a* is transferred in a series of sequential steps from one end of the first group of resistors to the other end thereof. A plurality of first latching relay contacts 21*aa*, 21*bb* . . . , 21*xx*, 21*yy* are used to perform this transfer. The relay contacts 21*aa*, etc., are controlled by a plurality of corresponding first relay coils 21*aaa*, 21*bbb*, etc.

Resistors in a second group 22, 22*b*, etc., may each have values of "10" ohms to represent a "10's" group. A second potentiometer connection 1*b* is transferred from one end of the second group of resistors to the other end thereof by a plurality of second latching relay contacts 22*aa*, 22*bb*, etc. The second relay contacts 22*aa*, etc., are controlled by a plurality of corresponding relay coils 22*aaa*, 22*bbb*, etc.

A third group of resistors comprises two identical sub-groups of similar resistors 23*a*, 23*b*, etc., and 24*a*, 24*b*, etc. Each of the sub-groups has a plurality of latching relay contacts 23*aa*, etc., and 24*aa*, etc., and corresponding relay coils 23*aaa*, etc., and 24*aaa*, etc. Each of the resistors in the two sub-groups may have a value of one ohm to represent a units group. The relay coils of the sub-groups are operated in pairs having a relay coil from one sub-group and a corresponding relay coil from the other sub-group. It is obvious that each pair of sub-group relay coils may be replaced by a single relay coil to control the corresponding relay contacts of the two sub-groups. The interconnected operation permits a further sequential change in the reference signal without affecting the current balance of the potentiometer circuit. Thus, the removal of a resistor in one sub-group of resistors in the potentiometer circuit is counterbalanced by the introduction of a similar resistor in the other sub-group of resistors of the potentiometer circuit. Consequently, the potentiometer circuit is maintained in a current balanced condition to develop a stable series of reference signals.

A stepping switch 26 is used to sequentially operate the relay contacts of the three groups by means of the associated relay coils. A pair of moving contacts 27, 28 of the stepping switch 26 distribute the energizing signals from the positive signal line 10 and the negative signal line 9 to stationary contacts of the stepping switch 26. The stationary contacts are connected to corresponding relay coils of the previously discussed three groups.

Referring to FIG. 2, it may be seen that a first potentiometer connection 1*a* is initially connected to a low end 30 of the first group of resistors 21*a*, etc. The sequential operation of the relay contacts 21*aa*, etc., by the stepping switch 26 transfers the first connection 1*a* in ten steps to a high end 31 of the first group of resistors 21*a*, etc. Assuming the voltage drop across each of the "100" ohms resistors 21*a*, etc. is "100" volts, the reference signal is increased in discrete steps from zero volts to "1000" volts. The self-latching relay contacts 21*aa*, etc., retain the energized condition of the relay coils 21*aaa*, etc. Thus, when the energizing signal is switched from the positive signal line 10 to the negative signal line 9, as previously discussed, the latching relay contacts retain the energized position of the last actuated relay contact.

The further operation of the stepping switch 26 produces a sequential energization of the relay coils of the second group 22*aaa*, etc. The sequential operation of the second relay coils 21*aaa*, etc., transfer a second potentiometer connection 1*b* from a low point of the second group 32 to a high point of the second group 33. Since the value of each of the resistors of the second group represents a lower decimal group than the first group resistors, the voltage drop across each of second group resistors is "10" volts. However, the operation of second relay contacts 22*aa*, etc., is arranged to reduce the composite reference signal in discrete steps. Thus, the sequential operation of the second group of relay contacts may decrease the reference signal for a maximum of ten identical steps having a total value of "100" volts. The energization of the relays of the second group is terminated when the energizing signal is switched from the negative line 9 to the positive line 10. However, the latching relays of the second group also retain the energized position of the last actuated relay contact therein.

The latching relay contacts of the first sub-group 23*aa*, etc., and the second sub-group 21*aa*, etc., are operated as a single third group by simultaneously energizing a relay coil in the first sub-group and a corresponding relay coil in the second sub-group. The pairing of the relay contacts in the third group is effective to simultaneously remove a resistor, from one part of the potentiometer circuit and introduce a similar resistor to another part of the potentiometer circuit. The resistors of the two-sub-groups each have a voltage of "1" volt to represent a lower decimal group than the voltage drop across the resistors of the second group. Also, the sequential operation of the paired relay contacts is arranged to increase the composite reference signal in discrete steps, as in the case of the first group, by one volt for each sequential step; e.g., "10" volts for ten steps. The energization of the pairs of relay solenoids of the third group is terminated when the energizing signal is switched from the positive line 10 to the negative line 9. The energized position of the last actuated pair of relay contacts is retained by the latching relay contacts of the third group.

A ballast resistor 35 is included in the potentiometer circuit to provide a balanced circuit for the battery 20. Since in the illustration the total active resistance of the first and third groups of resistors is "1010" ohms, the ballast resistor 35 in combination with the "100" ohms of the second group of resistors must be equal to "1010" ohms. Consequently, the resistance of the ballast resistor 35 is "910" ohms.

The operation of the reference signal generator 1 shown in FIG. 2 may be exemplified by the previously mentioned numerical example using an input signal of "786" volts. The stepping switch 26 sequentially energizes the first relay coils 21*aaa*, etc., to transfer the first conact 1*a* in a series of discrete steps thereby to increase the reference signal. The sequential energization of the first relay coils 21*aaa*, etc., increases the reference signals in "100" volt steps until the comparator 4, shown in FIG. 1, switches the energizing signal from the positive line 10 to the negative line 9. The switching of the energizing signal occurs when the comparator 4 senses a change in polarity of its control signal. As previously discussed, the change in polarity of the control signal occurs when the reference signal is "800" volts. The energization of the first relay coils 21*aaa* is, consequently, terminated at the relay contact controlling the "800" volt level of the reference signal. The stepping switch 26 continues its automatic operation past the remaining stationary switch contacts connected to the first group of resistors without any further energization of the relay coils associated therewith. The "800" volt level of the reference signal is retained by the "800" volt latching relay contact.

The transfer of the energizing signal to the negative line 9 connects the energizing signal to the lower moving switch contact 28. The lower moving contact 28 effects a signal distribution when the stepping switch 26 reaches the stationary contacts connected to the second group of resistors 22*a*, etc. The sequential energization of the second relay coils 22*aaa*, etc., is effective to decrease the reference signal in "10" volt steps from the "800" volt level. The energization of the second relay coils 22*aaa*, etc. is terminated by the switching of the energizing signal from the negative line 9 back to the positive line 10 by the comparator 4. The switching of the energizing signal is produced when the reference signal is lower than the input signal thereby changing the polarity of the comparator control signal. This polarity change occurs at a reference signal of "780" or a "20" volt subtractive signal level. The "20" volt subtractive signal is retained by the corresponding latching relay contact of the second group.

After the switching operation of the energizing signal back to the positive line 10, the energizing signal is connected to the upper moving contact 27, and the lower moving contact 28 of the stepping switch 26 continues past the remaining stationary second group switch contacts without energizing the remaining second relay coils.

When the upper moving contact 27 reaches the stationary contacts associated with the third group of resistors, the stepping switch 26 sequentially energizes the third group of paired relay coils. The stepping switch 26 sequentially energizes the paired relay coils until the comparator control voltage again reverses its polarity and the energizing signal is removed from the upper moving contact 27. The polarity reversal controlling the energization of the third group of paired relay coils occurs at a sequential step producing a voltage of "7" volts. The latching relay contacts of the third group retain the "7" volts to produce a total reference signal of "787" volts. The stepping switch 26 continues its automatic operation to the end of its cycle without energizing any of the remaining third group relay coils.

The last energized relay coil of each group is sensed by an output device 11, shown in FIG. 1, and translated into an indication of the "786" volt value of the input signal.

Referring to FIG. 3, there is shown a suitable output device 11 for use with the signal generator 1, shown in FIG. 2. The output device 11 comprises three identical lamp banks 40, 41 and 42, with a corresponding relay contact control device 43, 44 and 45, respectively. Each of the lamp banks comprises a group of ten bulbs, each labeled with one of the numbers from "0" to "9" inclusive. Each of the relay control devices 43, 44 and 45 comprises a group of latching relay contacts arranged to be sequentially operated by a corresponding group of relay coils of the aforesaid first, second and third groups. Thus, a first control device 43 having a group of latching relay contacts controlling a first lamp bank 40 is sequentially operated by the first group of relay coils, 21*aaa*, etc. in synchronism with the first group of relay contacts 21*aa*, etc. The relay contacts of the first control device 43 are arranged to control the lamps in the first lamp bank 40 in a numerical sequence starting with the lamp labeled "0"; i.e., the relay contact controlled by the first relay coil 21*aaa*, is arranged to light the lamp labeled "0," etc. It may be seen that the first control device 43 distributes an energization signal to the lamp bank 40 through the latching relay contacts to retain a lamp energized therein as a representation of the last energized relay coil. Further, the indicated number of the lamp energized in the lamp bank is one less than the number of the step of the stepping switch 26 operating in the first group of resistors. As a result, the termination of energization, in the aforementioned numerical example, at the "8th" or "800" volt level is represented in the first lamp bank by a retention of the illumination of a lamp labeled "7."

The second control device 44 is sequentially operated by the second group of relay coils 22*aaa*, etc. in synchronism with second group of relay contacts 22*aa*, etc. The relay contacts of the second control device 44 are arranged to control the lamps in the second lamp bank 41 in a numerical sequence starting with the lamp labeled "9." The bulb labeled "9" is controlled by the first relay coil in the second group 22*aaa*; the bulb labeled "8" is controlled by the second relay coil 22*bbb*; etc. Consequently, the termination of energization of the second group of relay coils 22*aaa*, etc., at the second or "20" volt subtractive step is retained by the second control device 44 as an illumination of a lamp labeled "8."

The third lamp bank 42 and the third control device 45 is connected to the third group of paired relay coils in a manner similar to that described in relation to the first control device 43 and the first group of relay coils 21*aaa*, etc. The third control device may be connected either to the first sub-group of relay coils 23*aaa*, etc., or the second sub-group of relay coils 24*aa*, etc.

The termination of energization of the third group of paired relay coils at the seventh or "7" volt step is retained by the third control device 45 as an illumination of a lamp labeled "6."

The number illuminated by the lamp banks 40, 41 and 42 is "786," which is a digital representation of the analogue input signal. Thus, the output device 11 effects a translation of the operation of the signal generator 1 into an indication of a digital quantity.

The start-reset device 2, shown in FIG. 1, may be used to return the stepping switch 26 and the latching relays of the signal generator 1 and the output device 11 to an initial operating position prior to the initiation of an encoding cycle. Other comparison encoding measuring devices are shown and claimed in the copending application of J. A. Dever et al., Serial No. 787,141.

Thus, it may be seen that there has been provided, in accordance with the present invention, a comparison encoding measuring apparatus which is characterized by the ability to obtain a digital representation of an analogue input quantity.

What is claimed is:

A comparison encoding measuring device comprising a means for generating digitally related groups of reference signals having a similar polarity with respect to a common point in said means, said means including a plurality of resistor groups having in each group a plurality of serially connected resistors, said groups of resistors being arranged in a current-balanced split potentiometer circuit having a plurality of parallel circuits each arranged to be connected directly across a common power source with each of said resistor groups in a corresponding one of said parallel circuits, a power source connected to energize said parallel circuits in the potentiometer circuit, a plurality of relay contacts, each of said contacts being associated with a corresponding one of said resistors to selectively introduce or remove the signal developed thereacross and a plurality of relay coils for operating corresponding ones of said relay contacts, a single sequencing means for selectively supplying an energizing signal to each of said relay coils in a predetermined sequence to produce said groups of reference signals in a sequential arrangement, circuit means connected to an output signal from said split potentiometer circuit, said output signal comprising said groups of reference signals in an alternately additive and subtractive relationship with respect to each other to form a single combined reference signal, means connecting said combined reference signal in series with an input signal to be encoded, means for progressively comparing said groups of reference signals with an input signal representative of a measured variable to produce a polarity characterized difference control signal, a sensing means responsive to both polarities of said difference signal to control said means for generating sequential groups of reference signals by selectively controlling the application of an energizing signal to said sequencing means for distribution by said sequencing means to produce a combined reference signal having substantially a compared equality with said input signal to be encoded, and an output means responsive to said means for generating sequential groups of reference signals to indicate a digital value corresponding to the amplitude of said input signal.

References Cited in the file of this patent

UNITED STATES PATENTS

| | | |
|---|---|---|
| 2,577,499 | Anderson | Dec. 4, 1951 |
| 2,835,868 | Lindesmith | May 20, 1958 |
| 2,896,198 | Bennett | July 21, 1959 |
| 2,940,071 | Kindred | June 7, 1960 |